United States Patent
Carruthers

[11] Patent Number: 5,915,482
[45] Date of Patent: Jun. 29, 1999

[54] HAND TOOL WITH INTERCHANGEABLE ATTACHMENTS

[76] Inventor: Robert B. Carruthers, 2201 SE. 44th St., Portland, Oreg. 97215

[21] Appl. No.: 09/031,478

[22] Filed: Feb. 26, 1998

[51] Int. Cl.⁶ ............................... B25G 1/04; F16B 21/04
[52] U.S. Cl. ............................. 172/375; 403/348
[58] Field of Search ...................... 111/100, 106; 56/400.1, 400.04, 400.06; 7/114, 116, 167; 172/371, 372, 375

[56] References Cited

U.S. PATENT DOCUMENTS

| | | | |
|---|---|---|---|
| 2,606,050 | 8/1952 | Morris et al. | 172/375 |
| 3,243,165 | 3/1966 | De Woody et al. | 259/144 |
| 4,661,009 | 4/1987 | Tripp | 403/349 |
| 4,768,258 | 9/1988 | Langenstein | 403/348 X |
| 5,185,992 | 2/1993 | Garcia | 172/375 X |

Primary Examiner—Thomas B. Will
Assistant Examiner—Robert Pezzuto

[57] ABSTRACT

A new hand tool with interchangeable attachments for providing a gardener with several tools while requiring a single handle. The inventive device includes a handle portion having a dowel extending therethrough upwardly of a lower end thereof. The dowel has diametrically opposed end portions extending outwardly of the handle portion. A shank portion couples with the handle portion. The shank portion has a recess extending within an upper end thereof. The recess is dimensioned for receiving the lower end of the handle portion therein. The upper end has a pair of diametrically opposed vertical slots extending downwardly thereof in communication with the recess. The vertical slots slidably receive the opposed end portions of the dowel of the handle portion. A collar member is slidably disposed on the handle portion. The collar member has an externally threaded open upper end and an outwardly flared open lower end. The open lower end has a pair of diametrically opposed recesses extending upwardly thereof. The recesses receive the opposed outer ends of the dowel therein when in a fully engaged orientation.

5 Claims, 2 Drawing Sheets

HAND TOOL WITH INTERCHANGEABLE ATTACHMENTS

BACKGROUND OF THE INVENTION

1. Field of the Invention

The present invention relates to garden tools and more particularly pertains to a new hand tool with interchangeable attachments for providing a gardener with several tools while requiring a single handle.

2. Description of the Prior Art

The use of garden tools is known in the prior art. More specifically, garden tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art garden tools include U.S. Pat. No. 4,162,132 to Kress et al.; U.S. Pat. No. 4,214,538 to Druskin et al.; U.S. Pat. No. Des. 278,970 to Kolb; U.S. Patent No. Des. 311,310 to Clivio; U.S. Pat. No. 4,565,398 to Poulin; and U.S. Pat. No. 4,232,422 to Fellmann.

While these devices fulfill their respective, particular objectives and requirements, the aforementioned patents do not disclose a new hand tool with interchangeable attachments. The inventive device includes a handle portion having a dowel extending therethrough upwardly of a lower end thereof. The dowel has diametrically opposed end portions extending outwardly of the handle portion. A shank portion couples with the handle portion. The shank portion has a recess extending within an upper end thereof. The recess is dimensioned for receiving the lower end of the handle portion therein. The upper end has a pair of diametrically opposed vertical slots extending downwardly thereof in communication with the recess. The vertical slots slidably receive the opposed end portions of the dowel of the handle portion. A collar member is slidably disposed on the handle portion. The collar member has an externally threaded open upper end and an outwardly flared open lower end. The open lower end has a pair of diametrically opposed recesses extending upwardly thereof. The recesses receive the opposed outer ends of the dowel therein when in a fully engaged orientation.

In these respects, the hand tool with interchangeable attachments according to the present invention substantially departs from the conventional concepts and designs of the prior art, and in so doing provides an apparatus primarily developed for the purpose of providing a gardener with several tools while requiring a single handle.

SUMMARY OF THE INVENTION

In view of the foregoing disadvantages inherent in the known types of garden tools now present in the prior art, the present invention provides a new hand tool with interchangeable attachments construction wherein the same can be utilized for providing a gardener with several tools while requiring a single handle.

The general purpose of the present invention, which will be described subsequently in greater detail, is to provide a new hand tool with interchangeable attachments apparatus and method which has many of the advantages of the garden tools mentioned heretofore and many novel features that result in a new hand tool with interchangeable attachments which is not anticipated, rendered obvious, suggested, or even implied by any of the prior art garden tools, either alone or in any combination thereof.

To attain this, the present invention generally comprises a handle portion having a generally cylindrical configuration. The handle portion has a tapered lower end. The handle portion has a dowel extending therethrough upwardly of the tapered lower end thereof. The dowel has diametrically opposed end portions extending outwardly of the handle portion. A shank portion couples with the handle portion. The shank portion has a recess extending within an upper end thereof. The recess is dimensioned for receiving the tapered lower end of the handle portion therein. The upper end has a pair of diametrically opposed vertical slots extending downwardly thereof in communication with the recess. Lower ends of the vertical slots have horizontally disposed slots in communication therewith. Ends of the horizontally disposed slots have arcuate flaps disposed thereover. The vertical slots slidably receive the opposed end portions of the dowel of the handle portion whereby when the opposed end portions reach the lower ends of the vertical slots, the handle portion is rotated for sliding the opposed end portions into the horizontally disposed slots. A collar member is slidably disposed on the handle portion. The collar member has an externally threaded open upper end and an outwardly flared open lower end. The open lower end has a pair of diametrically opposed recesses extending upwardly thereof. The recesses receive the opposed outer ends of the dowel therein when in a fully engaged orientation. A locking ring is slidably disposed on the handle portion. The locking ring is internally threaded for engaging the externally threaded open upper end of the collar member in the fully engaged orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new hand tool with interchangeable attachments apparatus and method which has many of the advantages of the garden tools mentioned heretofore and many novel features that result in a new hand tool with interchangeable attachments which is not anticipated, rendered obvious, suggested, or even implied by any of the prior art garden tools, either alone or in any combination thereof.

It is another object of the present invention to provide a new hand tool with interchangeable attachments which may be easily and efficiently manufactured and marketed.

It is a further object of the present invention to provide a new hand tool with interchangeable attachments which is of a durable and reliable construction.

An even further object of the present invention is to provide a new hand tool with interchangeable attachments which is susceptible of a low cost of manufacture with regard to both materials and labor, and which accordingly is then susceptible of low prices of sale to the consuming public, thereby making such hand tool with interchangeable attachments economically available to the buying public.

Still yet another object of the present invention is to provide a new hand tool with interchangeable attachments which provides in the apparatuses and methods of the prior art some of the advantages thereof, while simultaneously overcoming some of the disadvantages normally associated therewith.

Still another object of the present invention is to provide a new hand tool with interchangeable attachments for providing a gardener with several tools while requiring a single handle.

Yet another object of the present invention is to provide a new hand tool with interchangeable attachments which includes a handle portion having a dowel extending therethrough upwardly of a lower end thereof. The dowel has diametrically opposed end portions extending outwardly of the handle portion. A shank portion couples with the handle portion. The shank portion has a recess extending within an upper end thereof. The recess is dimensioned for receiving the lower end of the handle portion therein. The upper end has a pair of diametrically opposed vertical slots extending downwardly thereof in communication with the recess. The vertical slots slidably receive the opposed end portions of the dowel of the handle portion. A collar member is slidably disposed on the handle portion. The collar member has an externally threaded open upper end and an outwardly flared open lower end. The open lower end has a pair of diametrically opposed recesses extending upwardly thereof. The recesses receive the opposed outer ends of the dowel therein when in a fully engaged orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
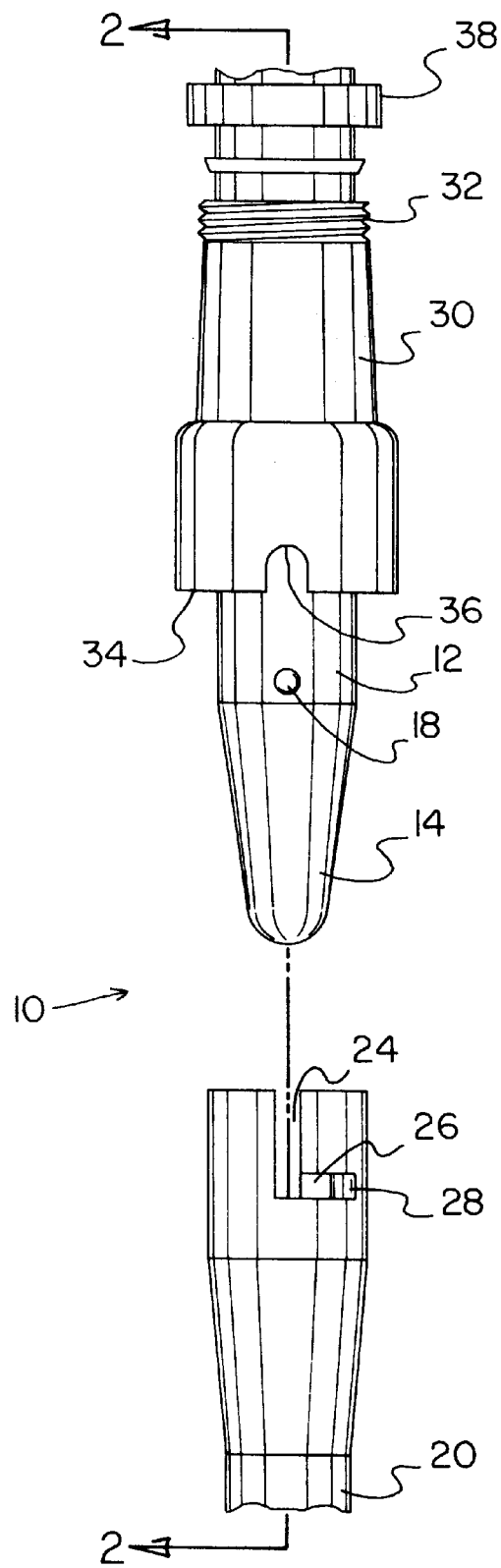
FIG. 1 is a front view of a new hand tool with interchangeable attachments according to the present invention illustrated in a disengaged orientation.
Figure 2:
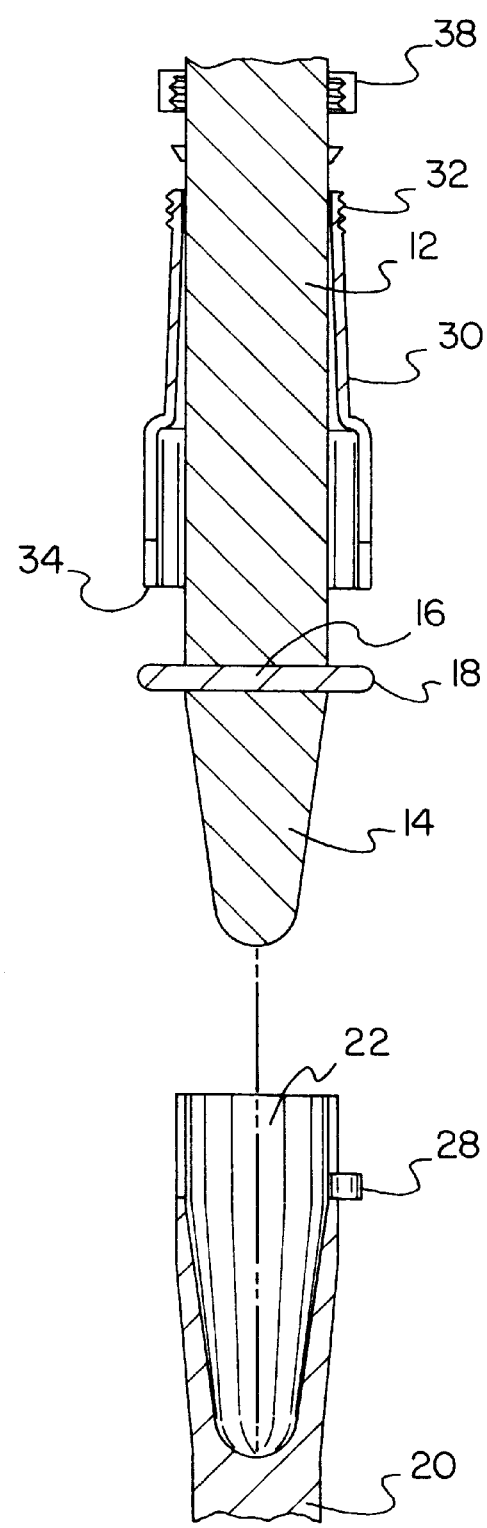
FIG. 2 is a cross-sectional view of the present invention as taken along line 2—2 of FIG. 1.
Figure 3:
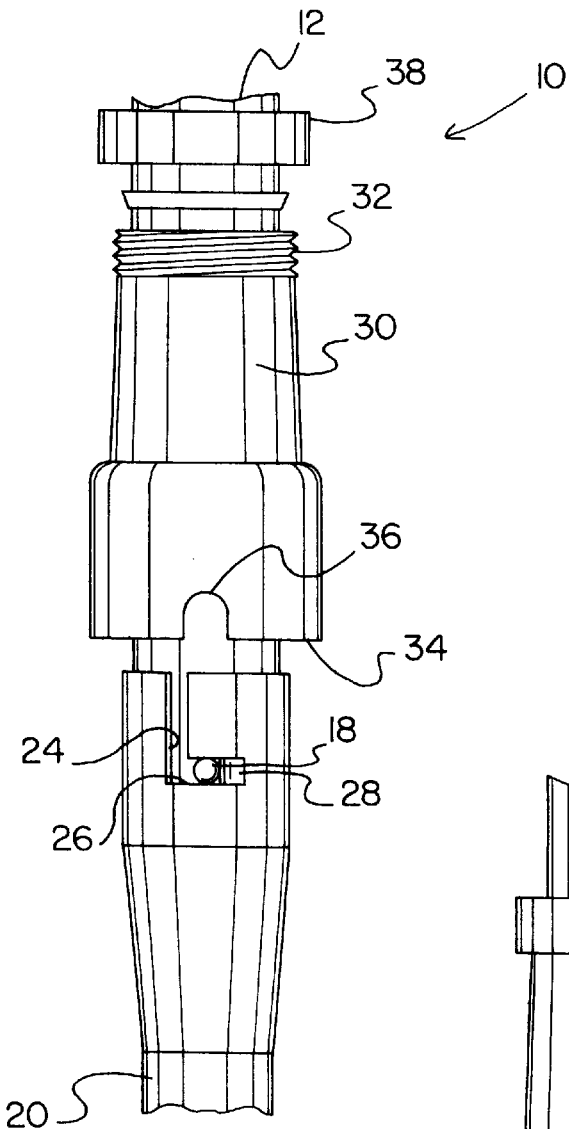
FIG. 3 is a front view of the present invention illustrated in partially engaged orientation.
Figure 4:
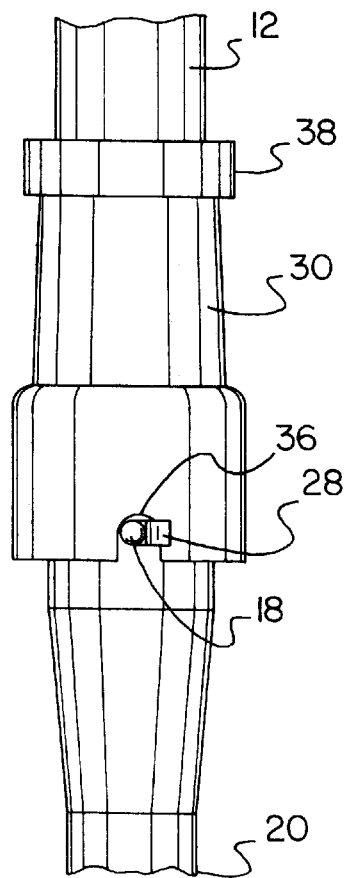
FIG. 4 is a front view of the present invention illustrated in a fully engaged orientation.

With reference now to the drawings, and in particular to FIGS. 1 through 4 thereof, a new hand tool with interchangeable attachments embodying the principles and concepts of the present invention and generally designated by the reference numeral 10 will be described.

As best illustrated in FIGS. 1 through 4, the hand tool with interchangeable attachments 10 comprises a handle portion 12 having a generally cylindrical configuration. The handle portion 12 has a tapered lower end 14. The handle portion 12 has a dowel 16 extending therethrough upwardly of the tapered lower end 14 thereof. The dowel 16 has diametrically opposed end portions 18 extending outwardly of the handle portion 12. The handle portion 12 would be full-length, constructed from plastic, wood, or aluminum.

A shank portion 20 couples with the handle portion 12. The shank portion 20 has a recess 22 extending within an upper end thereof. The recess 22 is dimensioned for receiving the tapered lower end 14 of the handle portion 12 therein. The upper end has a pair of diametrically opposed vertical slots 24 extending downwardly thereof in communication with the recess 22. Lower ends of the vertical slots 24 have horizontally disposed slots 26 in communication therewith. Ends of the horizontally disposed slots 26 have arcuate flaps 28 disposed thereover. The vertical slots 24 slidably receive the opposed end portions 18 of the dowel 16 of the handle portion 12 whereby when the opposed end portions 18 reach the lower ends of the vertical slots 24, the handle portion 12 is rotated for sliding the opposed end portions 18 into the horizontally disposed slots 26. A lower end of the shank portion 20 would include a tool disposed thereon. An example of such tools would include, but are not limited to a hoe, a spaded shovel, and a rake. Each attachment could be constructed from a durable steel.

A collar member 30 is slidably disposed on the handle portion 12. The collar member 30 has an externally threaded open upper end 32 and an outwardly flared open lower end 34. The open lower end 34 has a pair of diametrically opposed recesses 36 extending upwardly thereof. The recesses 36 receive the opposed outer ends 18 of the dowel 16 therein when in a fully engaged orientation.

A locking ring 38 is slidably disposed on the handle portion 12. The locking ring 38 is internally threaded for engaging the externally threaded open upper end 32 of the collar member 30 in the fully engaged orientation.

In use, to replace the shank portion 20 the user would need only unlock the locking ring 38 and slide it upwardly. The collar member 30 will then slide up allowing the handle portion 12 to be turned to move the dowel 18 out of the horizontally disposed slot 26 and raise upwardly out of the vertical slot 24. The shank portion 20 can then be separated from the handle portion 12 and replaced with an alternate attachment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand tool with interchangeable attachments for providing a gardener with several tools while requiring a single handle comprising, in combination:

a handle portion having a generally cylindrical configuration, the handle portion having a tapered lower end for facilitating insertion thereof into a receptacle, the handle portion having a dowel extending therethrough upwardly of the tapered lower end thereof, the dowel having diametrically opposed end portions extending outwardly of the handle portion;

a shank portion removably coupled to the handle portion, the shank portion having a tool extending from a lower end thereof, the shank portion having a recess extending within an upper end thereof, the recess tapering closed towards an inner terminal end thereof in a manner complementing the tapered lower end of the handle portion to limit penetration; the recess being dimensioned for receiving the tapered lower end of the handle portion therein, the upper end having a pair of diametrically opposed vertical slots extending downwardly thereof in communication with the recess, lower ends of the vertical slots having horizontally disposed slots in communication therewith, ends of the horizontally disposed slots having arcuate flaps disposed thereover, the vertical slots slidably receiving the opposed end portions of the dowel of the handle portion whereby when the opposed end portions reach the lower ends of the vertical slots, the handle portion is rotated for sliding the opposed end portions into the horizontally disposed slots;

a collar member slidably disposed on the handle portion, the collar member having an externally threaded open upper end and an outwardly flared open lower end, the open lower end having a pair of diametrically opposed recesses extending upwardly thereof, the recesses receiving the opposed outer ends of the dowel therein when in a fully engaged orientation; and a locking ring slidably disposed on the handle portion, the locking ring being internally threaded for engaging the externally threaded open upper end of the collar member in the fully engaged orientation.

2. A hand tool with interchangeable attachments for providing a gardener with several tools while requiring a single handle comprising, in combination:

a handle portion having a dowel extending therethrough upwardly of a lower end thereof, the dowel having diametrically opposed end portions extending outwardly of the handle portion;

a shank portion coupling with the handle portion, the shank portion having a tool extending from a lower end thereof, the shank portion having a recess extending within an upper end thereof, the recess being dimensioned for receiving the lower end of the handle portion therein, the upper end having a pair of diametrically opposed vertical slots extending downwardly thereof in communication with the recess, the vertical slots slidably receiving the opposed end portions of the dowel of the handle portion;

a collar member slidably disposed on the handle portion, the collar member having an externally threaded open upper end and an outwardly flared open lower end, the open lower end having a pair of diametrically opposed recesses extending upwardly thereof, the recesses receiving the opposed outer ends of the dowel therein when in a fully engaged orientation.

3. The hand tool with interchangeable attachments as set forth in claim 2 and further including a locking ring slidably disposed on the handle portion, the locking ring being internally threaded for engaging the externally threaded open upper end of the collar member in the fully engaged orientation.

4. The hand tool with interchangeable attachments as set forth in claim 2 wherein lower ends of the vertical slots having horizontally disposed slots in communication therewith whereby when the opposed end portions reach the lower ends of the vertical slots, the handle portion is rotated for sliding the opposed end portions into the horizontally disposed slots.

5. The hand tool with interchangeable attachments as set forth in claim 4 wherein ends of the horizontally disposed slots have arcuate flaps disposed thereover.

* * * * *